United States Patent
Mittag et al.

(10) Patent No.: US 6,477,195 B2
(45) Date of Patent: Nov. 5, 2002

(54) PROCESS FOR MELTING SPONGE IRON AND ELECTRIC-ARC FURNACE FOR CARRYING OUT THE PROCESS

(75) Inventors: Peter Mittag; Harald Berger, both of Linz (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 0 days.

(21) Appl. No.: 09/862,909

(22) Filed: May 22, 2001

(65) Prior Publication Data

US 2001/0048707 A1 Dec. 6, 2001

(30) Foreign Application Priority Data

May 31, 2000 (AT) .............................. 964/2000

(51) Int. Cl.[7] .......................... H05B 11/00; F27D 23/04
(52) U.S. Cl. .............................. 373/1; 373/85
(58) Field of Search .................. 373/1, 8, 9, 60, 373/79, 85; 266/200, 219

(56) References Cited

FOREIGN PATENT DOCUMENTS

| EP | 0418656 | 3/1991 |
|---|---|---|
| EP | 0964065 | 12/1999 |

*Primary Examiner*—Tu Ba Hoang
(74) *Attorney, Agent, or Firm*—Ostrolenk, Faber, Gerb & Soffen, LLP

(57) ABSTRACT

In a process for melting down sponge metal (11) in an electric-arc furnace (1) having at least one electrode (6), the sponge metal (11) is introduced into the electric-arc furnace (1) under formation of at least one sponge metal jet (15) which in the immediate vicinity of an electrode (6) hits the bath level (16) present in the electric-arc furnace (1), and for decarburization and/or intermixing the bath and/or charging energy oxygen is blown into the melt (7).

For a CO post-combustion, in addition to the oxygen introduced for decarburization and/or intermixing the bath and/or charging energy into the melt at least one jet (14) of oxygen or one jet (14) of an oxygen-containing gas is blown into the electric-arc furnace (1) at a low rate, which jet hits the bath level (16) in the region of the point of incidence of the sponge metal jet (15), which preferably is conveyed into the electric-arc furnace (1) by gravitation alone, and/or immediately adjacent to the point of incidence of the sponge metal jet (15) and which jet in the region or vicinity of that point of incidence, on the side facing the electrode(s) (6) of the electric-arc furnace (1), is shielded by the sponge metal jet (15) relative to the electrode(s) (6) in the form of a protective shield.

16 Claims, 4 Drawing Sheets

PROCESS FOR MELTING SPONGE IRON AND ELECTRIC-ARC FURNACE FOR CARRYING OUT THE PROCESS

BACKGROUND OF THE INVENTION

The invention relates to a process for melting down sponge metal, in particular sponge iron, in an electric-arc furnace having at least one electrode, wherein the sponge metal is introduced into the electric-arc furnace in the form of at least one sponge metal jet which in the immediate vicinity of an electrode hits the bath level present in the electric-arc furnace and wherein for decarburization and/or intermixing the bath and/or charging energy into the metal melt, oxygen is blown into the melt, and the invention relates to an electric-arc furnace for carrying out the process.

It is known (EP-0 964 065 A1, EP-0 418 656 A1) to introduce solids, such as steel works dusts, untreated filter dusts and/or scale or unreduced ore, into an electric-arc furnace, namely to blow them into a metal melt present in the electric-arc furnace. Here, it has turned out to be advantageous to supply, via a lance, oxygen above the bath level of the metal melt and within a slag layer situated above it and to thereby carry out in a region adjacent to the metal melt a post-combustion of carbon monoxide formed by a separate $O_2$ supply and to charge the heat quantity obtained in that post-combustion immediately into the metal melt.

Furthermore, it is known to provide post-combustion means for applying the CO post-combustion technology when smelting scrap. For this purpose, post-combustion nozzles and/or burners are fixedly installed in the electric-arc furnace. However, such means can not be used under flat-bath conditions.

SUMMARY OF THE INVENTION

The invention has as its object to make it possible to apply the CO post-combustion technology also to electric-arc furnaces which serve the purpose of melting down sponge metal, in particular sponge iron, under flat-bath conditions. With electric-arc furnaces for melting down sponge iron, sponge iron is introduced through a cover hole, which is arranged outside the center, namely roughly at the circumference of a cover heart, via a chute or slide, and this in large quantities of up to 7,000 kg/min. In practice, in the absence of specific measures, an average of 28 to 40 kg of sponge iron is introduced per MW of electric-power input and per minute. The sponge iron, which is in lumpy form (pellets and/or briquets) as well as, optionally, also in fine-particulate form, gets for example in the form of a trajectory parabola close to the center of the electric-arc furnace, that is, its energy center, in which one electrode or several electrodes are arranged. Hereby, a quick melting-down results. With a furnace of that kind, there is the problem that during improper introduction of oxygen for post-combustion purposes there may occur an increased electrode consumption by the oxygen, a decrease in the metallic discharging by increased iron loss as well as an increase in the thermal stress of the wall and cover elements of the electric-arc furnace, which in general are water-cooled, without energy being additionally transferred to the molten metal.

The invention aims at avoiding these disadvantages and difficulties and has as its object to provide a process and an electric-arc furnace which enable a very efficient CO post-combustion when melting down sponge iron under flat-bath conditions, wherein introduction of the sponge metal into the energy center or its immediate vicinity should be possible.

According to the invention, this object is achieved in that in addition to the oxygen introduced for decarburization and/or intermixing the bath and/or charging energy into the metal melt at least one jet of oxygen or one jet of an oxygen-containing gas is blown into the electric-arc furnace at a low rate for a CO post-combustion, which jet hits the bath level in the region of the point of incidence of the sponge metal jet, and the sponge metal jet preferably is conveyed into the electric-arc furnace by gravitation alone, and/or immediately adjacent to the point of incidence of the sponge metal jet and which jet in the region or vicinity of that point of incidence, on the side facing the electrode(s) of the electric-arc furnace, is shielded by the sponge metal jet relative to the electrode(s) in the form of a protective shield.

Hereby, the CO forming during the impact of the carbon-containing sponge iron on the oxygen-containing slag and the subsequent melting-down is subjected to a post-combustion with oxygen to form $CO_2$, and the energy thus being released is additionally imparted to the sponge iron of the feed jet and to the slag and/or the bath. The hot slag thereby exhibits an improved foaming behavior and better envelops the electric arc(s), whereby the radiation of heat to the water-cooled wall and cover elements is reduced. All in all, energy savings of $\geq 35$ kWh/t of liquid steel result therefrom.

Thus, according to the invention, at least one separate jet of oxygen or jet of an oxygen-containing gas is introduced into the electric-arc furnace only for the CO post-combustion; here, it is essential that this/these oxygen jet(s) is/are directed into the energy center and into the region and/or immediate vicinity of the point of incidence of the sponge iron on the melt and that a protection of the electrodes from direct contact with oxygen is nonetheless provided.

The oxygen jet or jet of an oxygen-containing gas, which is additionally blown in, preferably is blown into the electric-arc furnace at a subsonic speed.

Preferably, the oxygen jet or jet of an oxygen-containing gas, which is additionally blown in, is blown in under a low pressure, preferably under a pressure of 6 bars at the most, so that the slag is not displaced by the oxygen jet or jet of an oxygen-containing gas, additionally introduced for the CO post-combustion, whereby the electric arcs effectively remain enveloped by foamed slag. By a low pressure, the pressure at which no supersonic speed is attained with a predetermined nozzle diameter is understood.

Suitably, the sponge iron is introduced into the electric-arc furnace in lumpy form, preferably as pellets and/or briquets, and, optionally, partly in the form of fines.

According to a preferred embodiment, the oxygen jet or jet of an oxygen-containing gas from roughly half the free height of the interior of the electric-arc furnace to the point of incidence on the bath level is shielded by the sponge metal jet relative to the electrode(s) at least on the side facing the electrode(s), "roughly" comprising±20%, preferably±10%.

An electric-arc furnace for carrying out the process according to the invention, comprising at least one electrode and a cover charging hole for charging sponge metal by gravitation and comprising an oxygen feeding means for introducing oxygen into the metal melt, is characterized by at least one oxygen lance which through a cover opening can be brought into a position projecting into the inside of the furnace, which position is oriented in such a manner that the oxygen jet, seen from one electrode or the electrodes, at least in the region of the point of incidence of the sponge metal on the bath level is shielded relative to the electrode(s) by the sponge metal falling into the electric-arc furnace by gravitation.

For the exact positioning of the oxygen supply, the oxygen lance is movable relative to the electric-arc furnace, preferably pivotable and forwardly and backwardly displaceable.

BRIEF DESCRIPTION OF THE DRAWINGS

In the following, the invention will be explained in more detail with reference to exemplary embodiments represented in the drawings, wherein.

DESCRIPTION OF A PREFERRED EMBODIMENT

Figure 1:
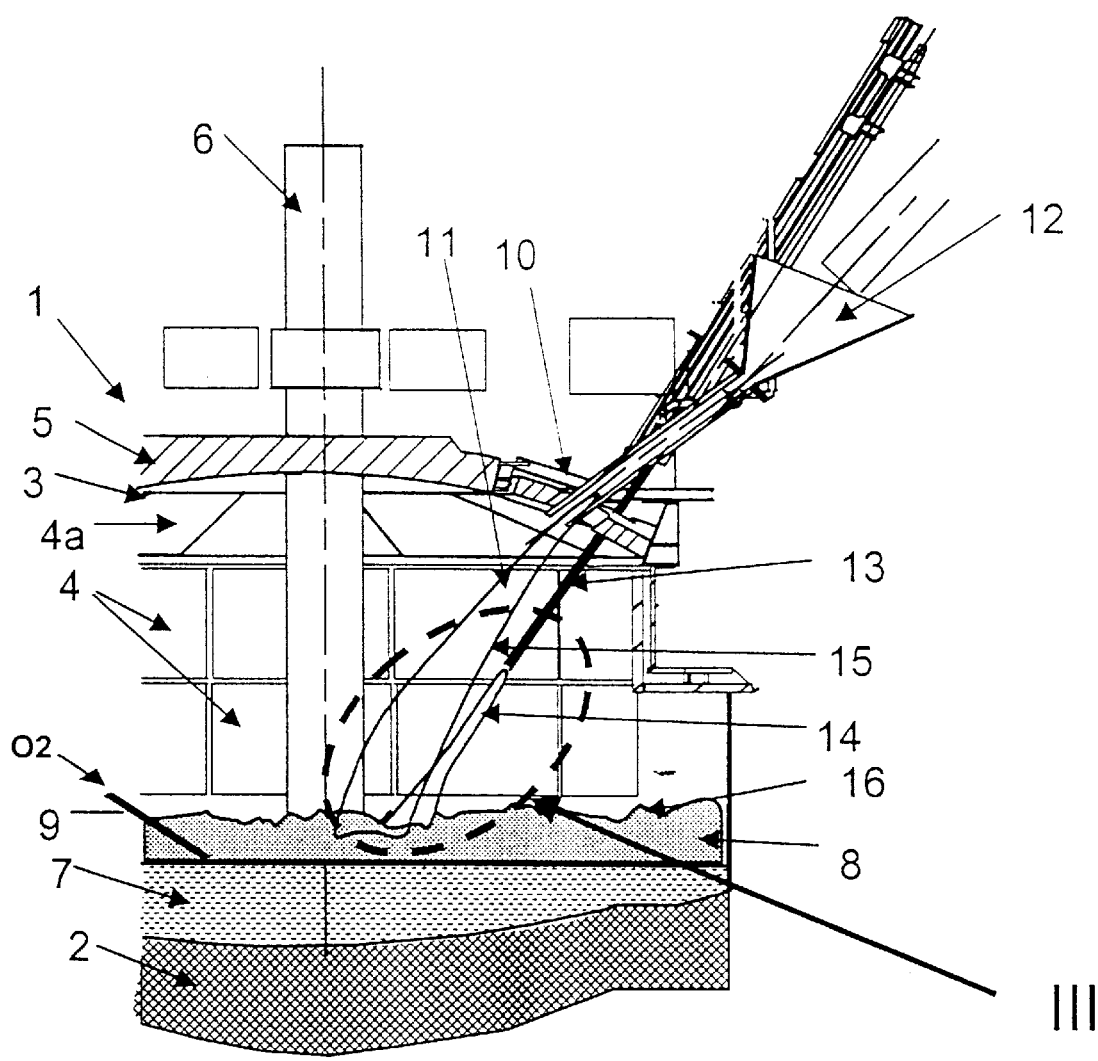
FIG. 1 shows a central vertical section of an electric-arc furnace (three-phase furnace) according to a first embodiment and FIGS. 2 and 4 show a diagrammatic top view of a three-phase or direct-current furnace according to another embodiment. By way of a detail III of FIG. 1, FIG. 3 renders the operating principle of the invention in diagrammatic representation.

An electric-arc furnace 1, the bottom portion 2 of which has a refractory lining, has a cover 3, which, together with water-cooled panels 4, forming the side walls of electric-arc furnace 1, forms the furnace chamber. Cover 3 itself is formed by a cover heart 5 and a ring of water-cooled panels 4a. Through the cover heart 5 according to FIG. 1 there projects an electrode 6, which is arranged in the center of electric-arc furnace 1 and which draws an electric arc to the surface of metal melt 7, which is covered by a slag layer 8. Into metal melt 7 there project lances 9, which feed oxygen into metal melt 7 and through the lances oxygen is introduced for decarburization, intermixing the bath and charging energy into metal melt 7.

At the side of cover heart 5, cover 3 has a cover opening 10, through which sponge iron 11 in the form of pellets and/or briquets as well as, optionally, also in the form of fines is conducted into the inside of the furnace via chutes or slides 12. Thus, departing from cover hole 10, sponge iron 11 in the form of a trajectory parabola falls into the vicinity of electrode 6, that is, into the energy center of electric-arc furnace 1 or its immediate vicinity, so that a quick melting-down of sponge metal 11 is ensured.

According to the invention, there further projects through cover 3 at least one oxygen lance 13, through which pure oxygen or an oxygen-containing gas is blown into electric-arc furnace 1 at a low speed, for example 200 m/s, and at a maximum pressure of 6 bars, preferably 3–6 bars. That oxygen lance, 13, is oriented in such a manner that oxygen jet 14 likewise hits bath surface 16 in roughly the region where sponge iron jet 15 hits the bath surface; however, the orientation of oxygen lance 13 is chosen such—and this is essential to the invention—that sponge iron jet 15 between electrode 6 and oxygen jet 14 forms a protective shield which prevents immediate contact of the oxygen blown in with electrode 6.

This is done by accordingly constructing cover hole 10 for feeding sponge iron 11, so as to obtain a protective shield of sponge iron 11, which is as effective as possible and which improves the energy absorption from the post-combustion and protects electrode(s) 6 from oxygen jet 14.

Figure 3:
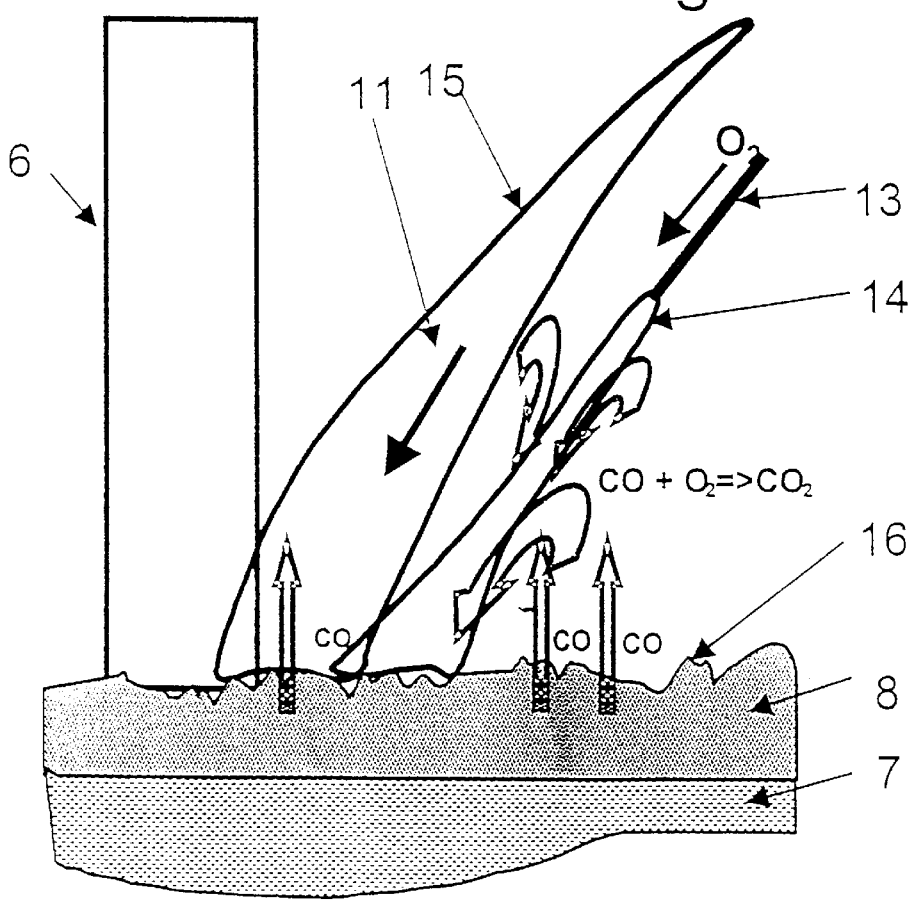

As can be seen especially in FIG. 3, mainly the CO formed in roughly the region of the energy center, that is, in the region of the point of incidence of sponge metal 11 on bath level 16, immediately after ascending through slag layer 8 is subjected to post-combustion by the oxygen offer present in that region to form $CO_2$.

Oxygen lance 13 is a specifically positionable water-cooled post-combustion lance which advantageously is mounted on a manipulator, so that the oxygen jet can be oriented exactly as desired within the furnace chamber. Preferably, the manipulator is mounted on a cover supporting arm of the furnace in the region of furnace cover 3, namely in the vicinity of cover hole 10 for introducing sponge iron 11.

Post-combustion only is started when sponge metal 11 already falls into the inside of the electric-arc furnace with a specific minimum rate, such as around 1,000 kg/min, and when there is already oxygen being blown into iron bath 7. Hereby, the function of sponge iron jet 15, generated between the oxygen jet and the electrode, as a protective shield is ensured.

Figure 2:
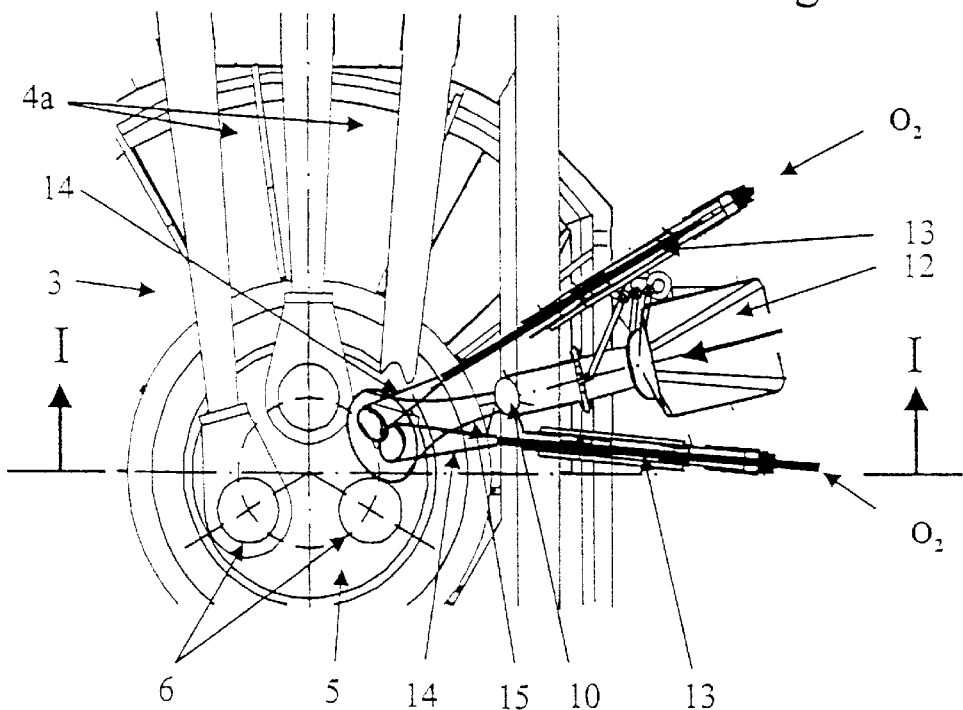

In FIG. 2 it can be seen that sponge iron jet 15, introduced into the energy center of the electric-arc furnace whenever possible, forms a protective shield for the three electrodes, 6, so that an immediate contact of electrodes 6 with oxygen fed via oxygen lances 13 can be avoided.

Figure 4:
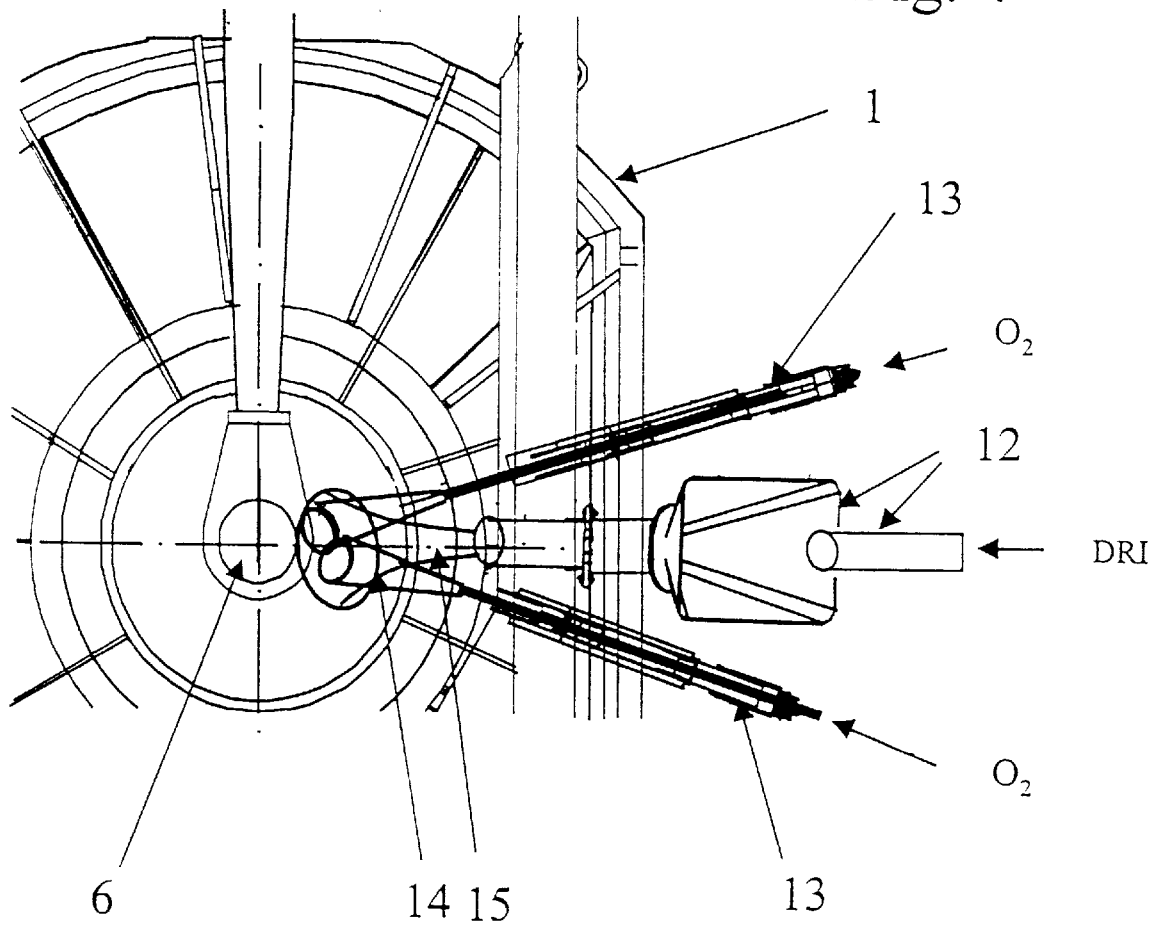

As shown in the embodiment of FIG. 4, the same idea is also applied to an electric-arc furnace 1 driven by direct current, in which embodiment sponge iron jet 15 shields oxygen jets 14, supplied by oxygen lances 13, relative to single electrode 6.

Figure 5:
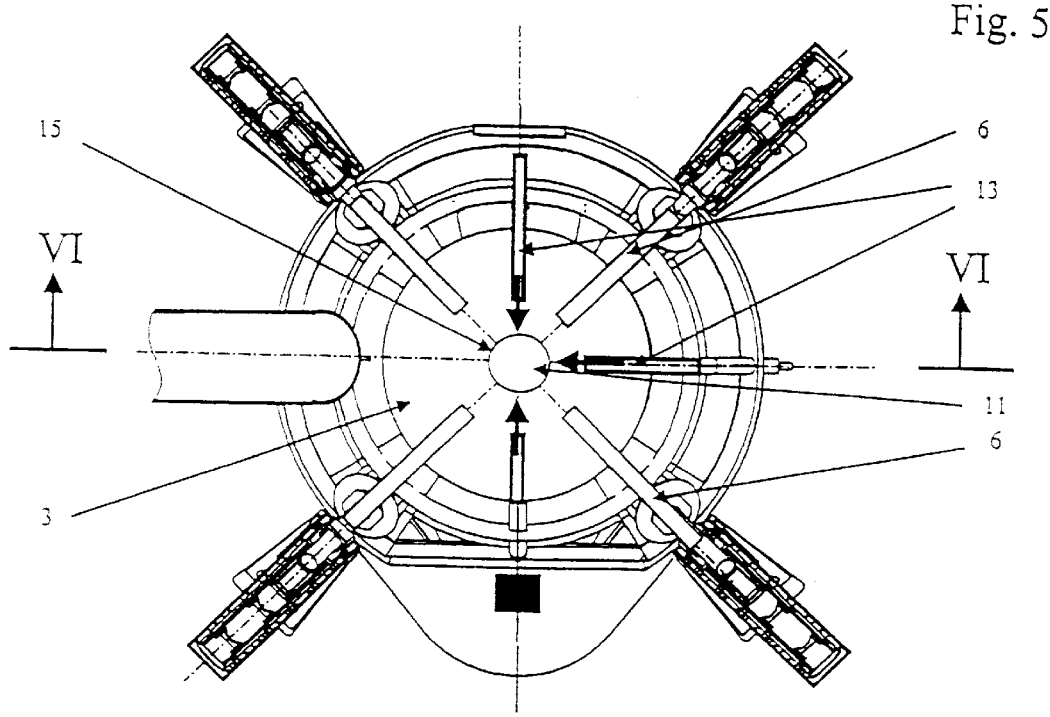
FIGS. 5 and 6 illustrate a diagrammatic top view and a vertical section along line VI—VI of FIG. 5 of an inclined electrode furnace according to a further embodiment of the invention.
Figure 6:
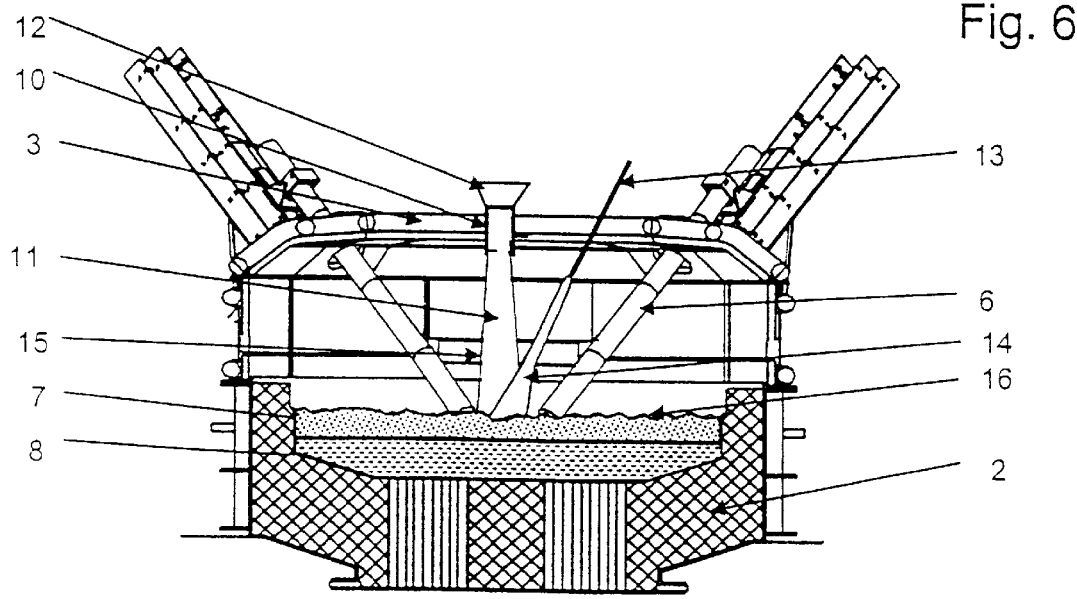

In an inclined-electrode furnace (COMELT) having inclined electrodes 6 evenly distributed along the furnace circumference, according to FIGS. 5 and 6, sponge iron 11, in contrast to the exemplary embodiments represented in the other figures, does not fall into the energy center, located within the circle circumference formed by the electrode ends, in the form of a trajectory parabola but vertically and centrally in free fall. Post-combustion lances 13, arranged for example in the middle of two inclined electrodes 6 on cover 3 and whose number is three in the example represented in FIG. 5, likewise blow oxygen into the region of the point of incidence of sponge iron jet 15 at a low pressure and a low rate, but without aiming into the direction of an electrode 6. In spite of its position surrounded by inclined electrodes 6, vertically falling sponge iron jet 15 forms, with its periphery in the form of a cone envelope, a protective shield between oxygen jets 14 of oxygen lances 13 and a part of electrodes 6. Due to its/their oblique arrangement, electrode(s) 6 not protected by a protective shield of sponge metal do(es) not undergo a bigger waste than the other electrodes 6.

The configurations of sponge iron jet 15 and oxygen jets 14 suitably are chosen such that a protection by sponge iron jet 15 is ensured up to a specific height above bath level 16, namely up to half±20%, preferably±10%, the free height, H, of the interior of electric-arc furnace 1.

For the CO post-combustion there are blown in between 300 $Nm^3$/h and 1300 $Nm^3$/h of oxygen or oxygen-containing gas per oxygen lance 13 at a pressure of—as already mentioned—6 bars at the most. Hereby, oxygen jet 14, when hitting slag layer 8, is prevented from exercising a negative influence on the foaming behavior or penetrating or displacing the slag. Oxygen lance 13 is equipped with a nozzle having a diameter of between 20 and 60 mm. Preferably, it is made of copper.

The oxygen blowing rate of the post-combustion lance(s) is controlled stepwise and is guided by the following parameters:

sponge iron conveying rate sum of the oxygen blowing rate via the refining lances being employed carbon content of the sponge metal waste gas analysis At a conveying rate of for example 3 t of sponge iron/min and an oxygen blowing rate for the refining of about 3,000 $Nm^3/h$ and a carbon content of the sponge iron of about 2%, for the CO post-combustion there are blown in 13,800 $Nm^3/h$ per oxygen lance under low pressure, preferably 3–6 bars, when two oxygen lances 13 are provided.

What is claimed is:

1. A process for melting a sponge metal in an electric-arc furnace, wherein the furnace has an interior and at least one electrode which extends down through the furnace interior into the metal melt in the furnace comprising:

directing at least one jet of sponge metal from above through the furnace into the immediate vicinity of the electrode at the level of the metal bath present in the furnace;

blowing oxygen into the metal melt for at least one of decarburization, intermixing the bath and charging energy into the metal melt;

directing at least one jet of oxygen or a gas containing oxygen into the furnace at a low rate for a CO post combustion, directing the jet so that it hits the bath level in the region of the point of incidence of the sponge metal on the bath level, directing the jet of air to the bath and with respect to the sponge metal jet so that on the side of the jet of gas facing the electrode in the vicinity of the point of incidence of the gas on the melt, the sponge metal jet shields the gas from reaching the electrode before contacting the melt.

2. The process of claim 1, wherein the sponge metal jet is conveyed into the electric-arc furnace by gravitation.

3. The process of claim 1, wherein the gas jet is blown into the furnace at a subsonic speed.

4. The process of claim 3, wherein the jet of gas is blown into the furnace under a reduced pressure of under 6 bars.

5. The process of claim 1, wherein the jet of gas is blown into the furnace under a reduced pressure of under 6 bars.

6. The process of claim 1, wherein the sponge metal is sponge iron.

7. The process of claim 6, wherein the sponge iron is introduced into the furnace in lump form.

8. The process of claim 6, wherein the sponge iron is introduced into the furnace as at least one of pellets and briquets.

9. The process of claim 6, wherein the sponge iron is introduced into the furnace as fines.

10. The process of claim 1, wherein the gas jet is directed toward the sponge metal and the sponge metal jet is so directed at the furnace that the gas jet is shielded by the sponge metal jet relative to the electrode on the side facing the electrode from roughly half the free height of the interior of the furnace to the point of incidence of the gas jet on the bath level.

11. An electric-arc furnace for melting sponge metal and forming metal melt in the furnace, the furnace comprising:

a furnace chamber with an interior;

an electrode extending down through the furnace chamber and into the melt in the furnace;

a cover over the furnace chamber with a charging hole for charging therein of sponge metal so that the sponge metal charged into the furnace falls under the influence of gravity;

oxygen feed elements for introducing oxygen into the metal melt;

at least one lance for conveying oxygen or oxygen containing gas through the cover into a position to project a jet of the gas into the interior of the furnace chamber, the lance being oriented so that the gas from the gas jet is shielded from contact with the electrode by the sponge metal falling through the furnace chamber under the influence of gravity, at least in the region of the point of incidence of the sponge metal on the bath level in the furnace chamber.

12. The furnace of claim 11, wherein the lance is movable relative to the furnace chamber for aiming the gas with respect to the metal melt and the electrode.

13. The furnace of claim 12, wherein the lance is pivotable and forwardly and rearwardly displaceable.

14. The furnace of claim 11, wherein the lance is operable so that the gas jet is blown into the furnace at a subsonic speed.

15. The furnace of claim 11, wherein the lance is operable so that the gas jet is blown into the furnace under a reduced pressure of under 6 bars.

16. The furnace of claim 11, wherein the lance is operable so that the gas jet is directed toward the sponge metal and the sponge metal jet is so directed at the furnace that the gas jet is shielded by the sponge metal jet relative to the electrode on the side facing the electrode from roughly half the free height of the interior of the furnace to the point of incidence of the gas jet on the bath level.

* * * * *